UNITED STATES PATENT OFFICE.

BENJIMAN F. KELLOGG, OF GRAND RAPIDS, MICHIGAN.

COMPOSITION OF MATTER FOR MORTAR, &c.

SPECIFICATION forming part of Letters Patent No. 539,745, dated May 21, 1895.

Application filed March 14, 1895. Serial No. 541,803. (No specimens.)

*To all whom it may concern:*

Be it known that I, BENJIMAN F. KELLOGG, a citizen of the United States, residing at the city of Grand Rapids, in the county of Kent and State of Michigan, have invented a certain new and useful Composition of Matter, of which the following is a specification.

My invention relates to a new and useful composition of matter to be used as a mortar or cement in connection with the construction of stone or brick walls or foundations, and for other purposes where a mortar is required. It is also useful as a plaster for walls in houses, or other places where plaster is required, and it may be used as a foundation for concrete walls, and for various other purposes.

My composition consists of the following ingredients combined in substantially the proportions stated: calcined gypsum or plaster, fifteen pounds; pulverized peat, fifteen pounds; iron dust, fifteen pounds; common salt, fifteen pounds; ashes, fifteen pounds; slaked lime (carbonate), one barrel; sand, four barrels. Sufficient water is used to mix the above ingredients into a mortar of sufficient consistency for ordinary use.

The proportions above given can be varied somewhat without departing from the spirit of my invention.

I have referred to ashes as one of the ingredients. They may be from wood or coal, or any other ordinary combustible material.

In practical use it will be found that sometimes the mortar should be made thicker so as to have greater consistency than at other times. To a person familiar with the use of mortar there will be no difficulty in mixing the above ingredients to the proper consistency for the purpose for which the same is to be used.

Having thus described my invention, what I claim to have invented, and desire to secure by Letters Patent, is—

The herein described composition of matter to be used for a mortar, the same consisting of calcined gypsum, pulverized peat, iron dust, salt, ashes, slaked lime and sand, in substantially the proportions specified.

In witness whereof I have hereunto set my hand and seal in the presence of two witnesses.

BENJIMAN F. KELLOGG. [L. S.]

Witnesses:
EDWARD TAGGART,
CHRISTOPHER HONDELINK.